US009310494B2

(12) United States Patent
Toyama et al.

(10) Patent No.: US 9,310,494 B2
(45) Date of Patent: Apr. 12, 2016

(54) SCINTILLATOR PANEL AND RADIATION DETECTOR

(71) Applicant: HAMAMATSU PHOTONICS K.K., Hamamatsu-shi, Shizuoka (JP)

(72) Inventors: Shintaro Toyama, Hamamatsu (JP); Yutaka Kusuyama, Hamamatsu (JP); Masanori Yamashita, Hamamatsu (JP); Hirotake Osawa, Hamamatsu (JP); Katsuhiko Suzuki, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/427,489

(22) PCT Filed: Sep. 17, 2013

(86) PCT No.: PCT/JP2013/075035
§ 371 (c)(1),
(2) Date: Mar. 11, 2015

(87) PCT Pub. No.: WO2014/042274
PCT Pub. Date: Mar. 20, 2014

(65) Prior Publication Data
US 2015/0247935 A1    Sep. 3, 2015

(30) Foreign Application Priority Data

Sep. 14, 2012   (JP) ................................. 2012-203187

(51) Int. Cl.
*G01T 1/20*      (2006.01)
*G01T 1/202*     (2006.01)
*G21K 4/00*      (2006.01)

(52) U.S. Cl.
CPC . *G01T 1/202* (2013.01); *G01T 1/20* (2013.01); *G01T 1/2018* (2013.01); *G21K 4/00* (2013.01)

(58) Field of Classification Search
CPC ... G01T 1/1642; G01T 1/1644; G01T 1/2018; G01T 1/20; G01T 1/204
See application file for complete search history.

(56) References Cited

U.S. PATENT DOCUMENTS 5,187,369 A     2/1993   Kingsley et al.
5,368,882 A *  11/1994   Tran et al. ........................ 427/65

(Continued)

FOREIGN PATENT DOCUMENTS

JP     S61-142497 A    6/1986
JP     H05-60871 A     3/1993

(Continued)

OTHER PUBLICATIONS

English-language translation of International Preliminary Report on Patentability (IPRP) dated Mar. 26, 2015 that issued in WO Patent Application No. PCT/JP2013/075035.

(Continued)

*Primary Examiner* — David Porta
*Assistant Examiner* — Mamadou Faye
(74) *Attorney, Agent, or Firm* — Drinker Biddle & Reath LLP

(57) ABSTRACT

A scintillator panel for converting radiation into scintillation light, the scintillator panel includes a substrate having a front surface and a back surface, and formed with a plurality of convex portions projecting from the front surface in a predetermined direction toward the front surface from the back surface and a concave portion defined by the convex portions, a plurality of first scintillator sections formed on the respective convex portions of the substrate, and a second scintillator section formed on the bottom surface of the concave portion of the substrate, and the first scintillator section has a first portion extending along the predetermined direction from an upper surface of the convex portion and a second portion extending along the predetermined direction from side surfaces of the convex portion so as to contact with the first portion, the first and second portions are composed of a plurality of columnar crystals of a scintillator material, the first scintillator sections are separated from one another, and the second scintillator section is in contact with the second portion.

8 Claims, 8 Drawing Sheets

(56) References Cited

U.S. PATENT DOCUMENTS

| | | | |
|---|---|---|---|
| 6,429,414 B1* | 8/2002 | Spahn | 250/208.1 |
| 7,521,685 B2* | 4/2009 | Hennessy et al. | 250/370.11 |
| 2013/0048864 A1* | 2/2013 | Nakatsugawa | 250/366 |
| 2013/0211233 A1* | 8/2013 | Yamaya et al. | 600/411 |

FOREIGN PATENT DOCUMENTS

| | | |
|---|---|---|
| JP | 2000-009847 A | 1/2000 |
| JP | 2001-128064 A | 5/2001 |
| JP | 2004-003955 A | 1/2004 |
| JP | 2004-012282 A | 1/2004 |
| JP | 2011-220774 A | 11/2011 |

OTHER PUBLICATIONS

U.S. Office Action dated Feb. 2, 2016 that issued in U.S. Appl. No. 14/759,739 including Double Patenting Rejections on pp. 2-9.

* cited by examiner

SCINTILLATOR PANEL AND RADIATION DETECTOR

TECHNICAL FIELD

An aspect of the present invention relates to a scintillator panel and a radiation detector.

BACKGROUND ART

As a conventional technique in the above-described technical field, for example, a radiation detection element described in Patent Document 1 has been known. The radiation detection element described in Patent Document 1 includes a glass substrate, an optical sensor unit including a plurality of photoelectric conversion elements which is provided on the glass substrate, a planarizing film provided on the optical sensor unit, and a plurality of scintillator sections which are provided on the planarizing film. In particular, in this radiation detection element, a plurality of convex portions corresponding to the respective photoelectric conversion elements are formed on the planarizing film, and the respective scintillator sections are formed on the upper surfaces of the convex portions so as to be partitioned while being in contact with each other.

CITATION LIST

Patent Literature

Patent Document 1: Japanese Patent Application Laid-Open No. 2001-128064

SUMMARY OF INVENTION

Technical Problem

In the radiation detection element described in Patent Document 1, as described above, suppression of a decrease in MTF caused by crosstalk in the scintillator sections is aimed by forming the convex portions on the planarizing film on the substrate and the optical sensor unit and forming the scintillator sections on the upper surfaces of the convex portions so as to be partitioned from each other, as compared with the case where the scintillator sections are formed all over the substrate and the optical sensor unit.

However, when the scintillator sections are formed on the upper surfaces of the convex portions of the planarizing film as in the radiation detection element described in Patent Document 1, the adhesiveness of the scintillator sections may be decreased, and its reliability may be decreased as compared with the case where the scintillator sections are formed all over the substrate and the optical sensor unit (that is, the entire surface of the planarizing film).

An aspect of the present invention has been achieved in consideration of such circumstances, and an object of an aspect of the present invention is to provide a scintillator panel and a radiation detector which are capable of suppressing a decrease in reliability.

Solution to Problem

In order to solve the above-described problems, a scintillator panel according to an aspect of the present invention, which is for converting radiation into scintillation light, the scintillator panel includes a substrate having a front surface and a back surface, and formed with a plurality of convex portions projecting from the front surface in a predetermined direction toward the front surface from the back surface and a concave portion defined by the convex portions, a plurality of first scintillator sections formed on the respective convex portions of the substrate, and a second scintillator section formed on the bottom surface of the concave portion of the substrate, the first scintillator section has a first portion extending along the predetermined direction from an upper surface of the convex portion, and a second portion extending along the predetermined direction from side surfaces of the convex portion so as to contact with the first portion, the first and second portions are composed of a plurality of columnar crystals of a scintillator material, the first scintillator sections are separated from one another, and the second scintillator section is in contact with the second portions.

This scintillator panel includes the first scintillator sections formed on the plurality of convex portions of the substrate, and the second scintillator section formed on the bottom surface of the concave portion defined by the convex portions of the substrate. In particular, the first scintillator sections include, in addition to the first portions extending from the upper surfaces of the convex portions, the second portions extending from the side surfaces of the convex portions so as to be contact with the first portions. Therefore, the contact area between the entire first scintillator sections and the substrate is increased, thereby adhesiveness is improved. Moreover, the second portions are in contact with the second scintillator section formed on the bottom surface of the concave portion. Therefore, because the plurality of columnar crystals composing the second portion is supported by the second scintillator section from the side of the bottom surface of the concave portion, these are prevented from missing. Therefore, in accordance with this scintillator panel, it is possible to suppress a decrease in reliability. In addition, because the first scintillator sections further have, in addition to the first portions, the second portions extended from the side surfaces of the convex portions, in the case where radiation is made incident along the projecting direction of the convex portions (the predetermined direction toward the front surface from the back surface of the substrate), it is possible to keep an effective area wider.

In a scintillator panel according to an aspect of the present invention, the first portions may be composed of a plurality of the columnar crystals formed by crystal growth along the predetermined direction from the upper surface of the convex portion, and the second portion may be composed of a plurality of the columnar crystals formed by crystal growth along a direction intersecting with the predetermined direction from the side surfaces of the convex portion. In this case, in the case where radiation is made incident along the predetermined direction described above, it is possible to keep an effective area wider.

In a scintillator panel according to an aspect of the present invention, a column diameter of the columnar crystals composing the first portion may expand as distance from the upper surface of the convex portion increases, a column diameter of the columnar crystals composing the second portion may expand as distance from the side surfaces of the convex portion increases, and an enlargement factor of a column diameter of the columnar crystals composing the second portion may be greater than an enlargement factor of a column diameter of the columnar crystals composing the first portion. In this case, because the column diameter of the columnar crystals composing the second portion extending from the side surface of the convex portion is relatively greater, an effective area is made wider and the radiation absorption is improved.

In a scintillator panel according to an aspect of the present invention, a height of the convex portion may be greater than column diameters of the columnar crystals. In this case, it is possible to securely compose the second portions of a plurality of columnar crystals. Further, it is possible to form the first scintillator sections so as to securely separate those from each other.

A scintillator panel according to an aspect of the present invention may further include a protective film formed so as to cover the first and second scintillator sections. In this case, the moisture resistance of the first and second scintillator sections is improved.

A scintillator panel according to an aspect of the present invention may further include a light shielding layer formed among the first scintillator sections, and for shielding the scintillation light. In this case, because it is possible to confine scintillation light generated in each of the first scintillator sections, it is possible to realize high brightness and high resolution.

Here, in order to solve the above-described problem, a radiation detector according to an aspect of the present invention includes the scintillator panel described above, and the substrate is a sensor panel having a plurality of photoelectric conversion elements arrayed so as to be optically coupled to the first scintillator sections. Because this radiation detector includes the scintillator panel described above, it is possible to suppress a decrease in reliability. In particular, because the substrate is a sensor panel including the photoelectric conversion elements, it is possible to form the convex portions directly on the photoelectric conversion elements, and form the scintillator sections on the convex portions. Therefore, there is no need to paste together a scintillator panel and a sensor panel separately prepared.

In a radiation detector according to an aspect of the present invention, the convex portions of the substrate may be transmissive to the scintillation light. In this case, it is possible to efficiently bring scintillation light from the first scintillator section to reach the photoelectric conversion element via the convex portion.

Advantageous Effects of Invention

In accordance with an aspect of the present invention, it is possible to provide a scintillator panel having separated type scintillator sections and a radiation detector having separated type scintillator sections, which are capable of suppressing a decrease in reliability.

DESCRIPTION OF EMBODIMENTS

Hereinafter, a scintillator panel according to an embodiment will be described in detail with reference to the drawings. In addition, in the respective drawings, the same or the corresponding portions are denoted by the same reference signs, and overlapping descriptions thereof will be omitted. Scintillator panels according to the following embodiments are for converting incident radiation R such as X-rays into scintillation light such as visible light, and can be used as devices for radiation imaging, for example, in mammography equipment, chest examination equipment, CT devices, dental oral photographic apparatuses, radiation cameras, and the like.

First Embodiment

Figure 1:
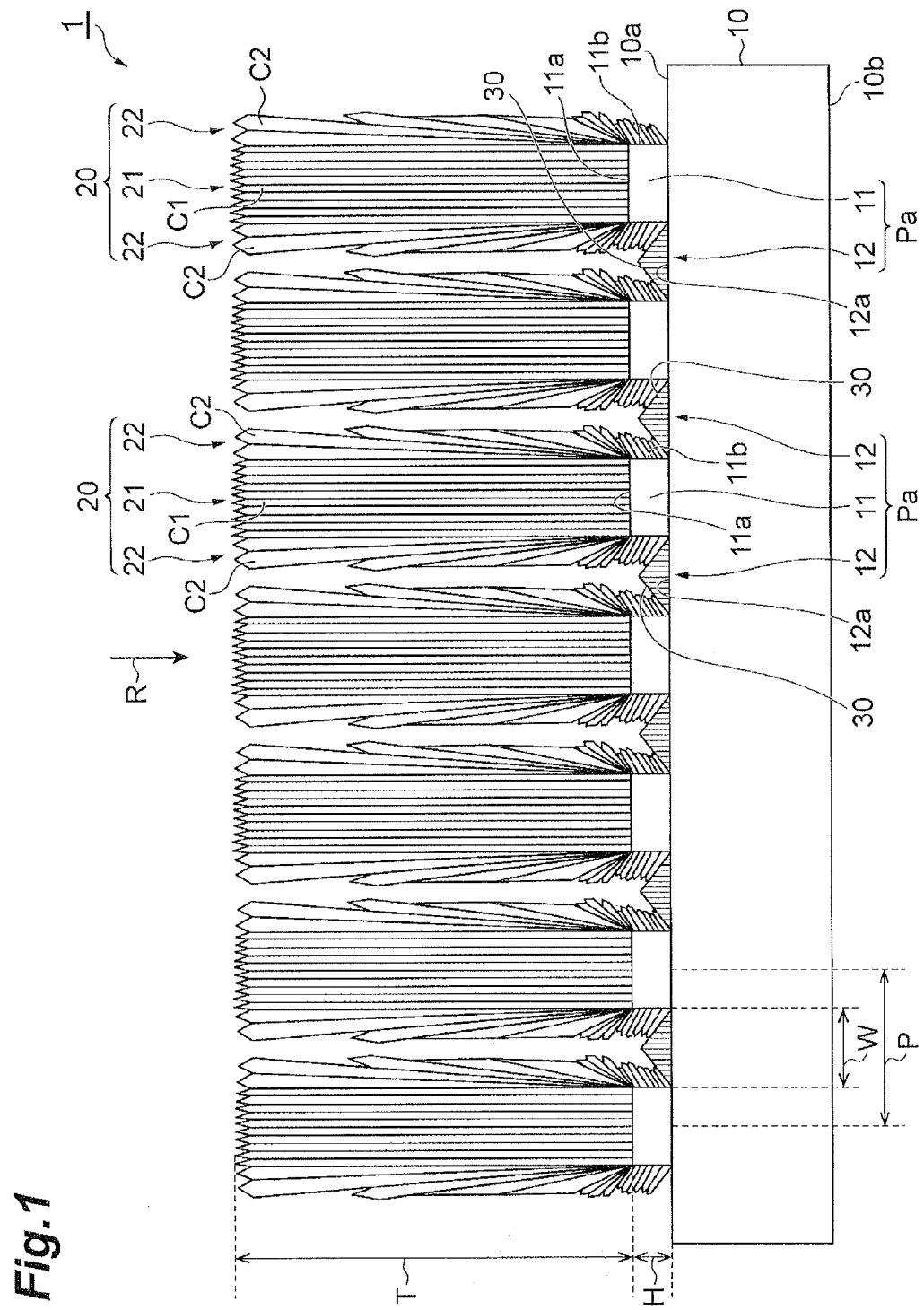
FIG. 1 is a side view of a scintillator panel according to a first embodiment.
Figure 2:
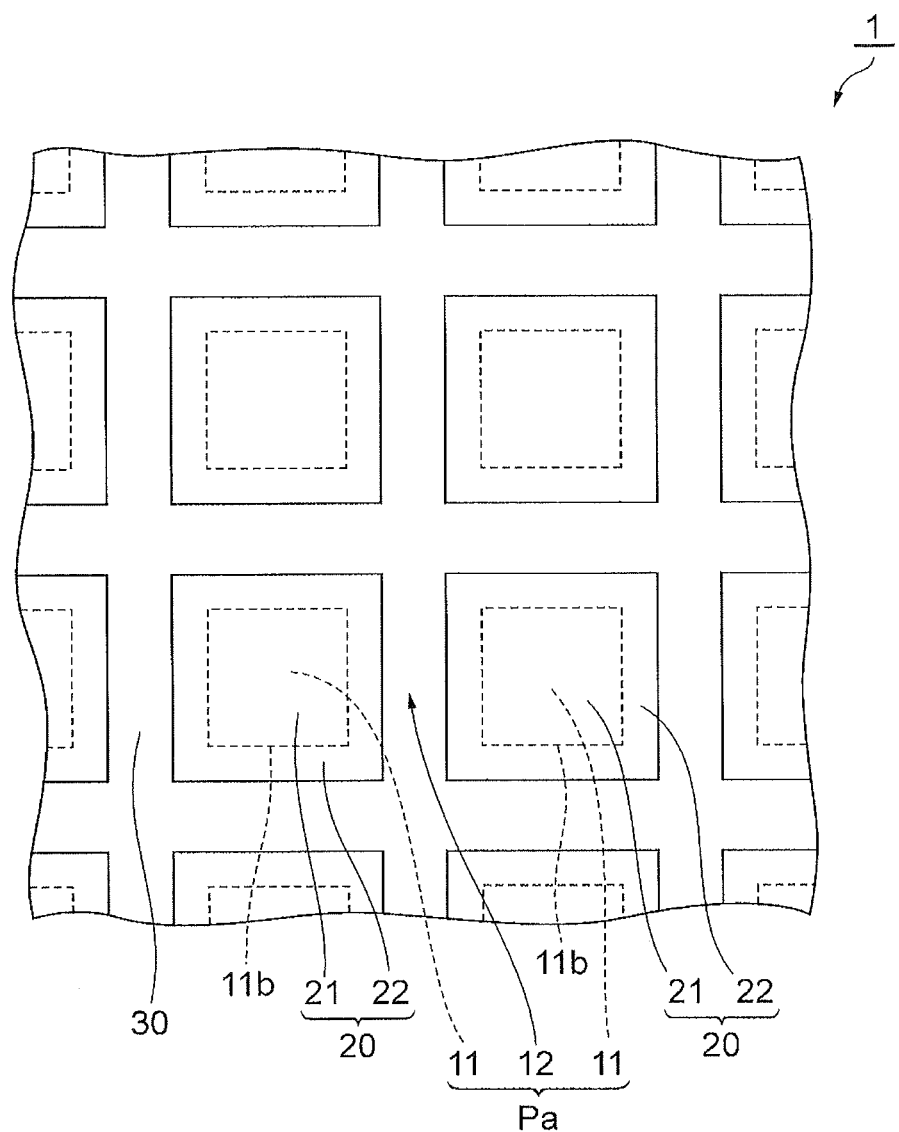
FIG. 2 is a partial plan view of the scintillator panel shown in FIG. 1.
Figure 3:
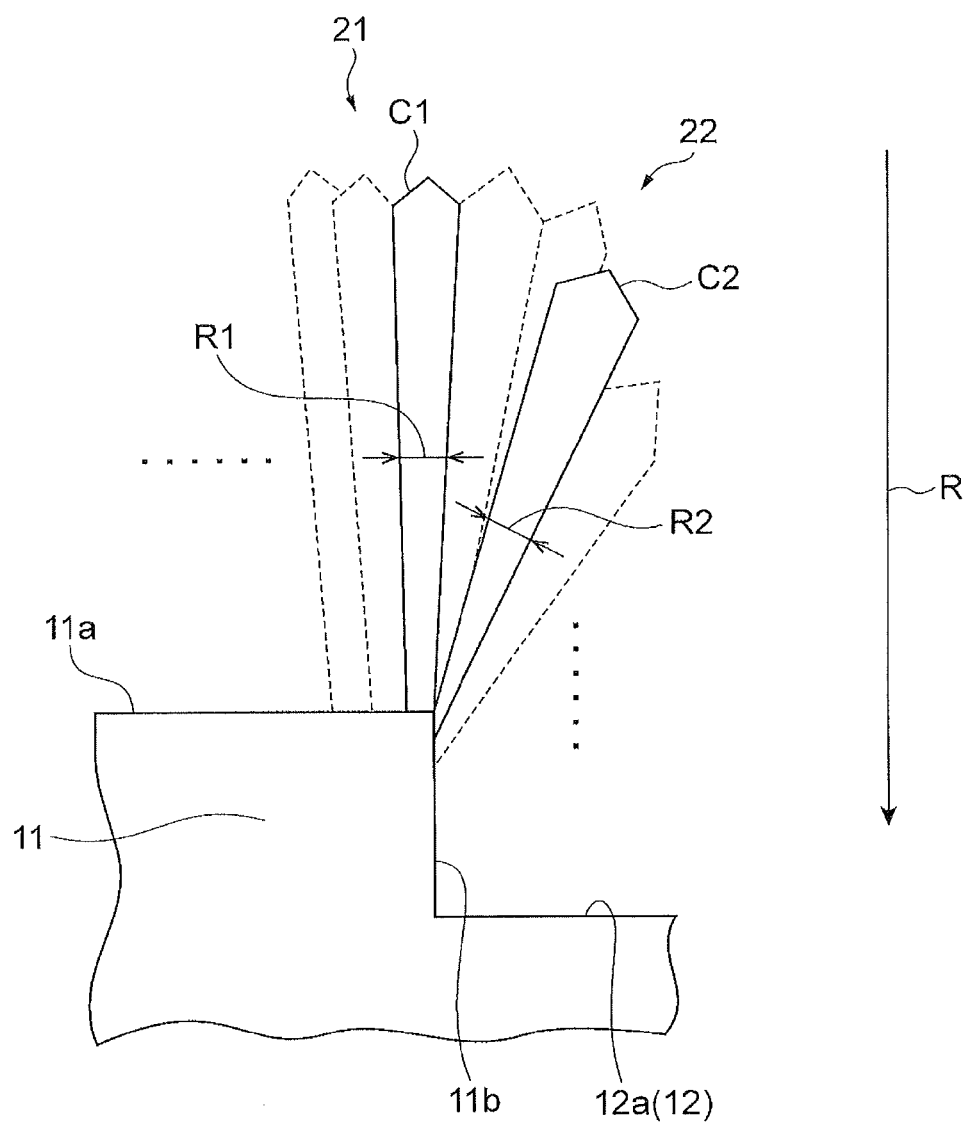
FIG. 3 is a partial side view of the scintillator panel shown in FIG. 1.

First, a scintillator panel according to a first embodiment will be described. FIG. 1 is a side view of the scintillator panel according to the first embodiment. FIG. 2 is a partial plan view of the scintillator panel shown in FIG. 1. FIG. 3 is a partial side view of the scintillator panel shown in FIG. 1. As shown in FIGS. 1 to 3, the scintillator panel 1 includes a rectangular substrate 10.

The substrate 10 has a front surface 10a and a back surface 10b facing each other. The substrate 10 has a concave-convex pattern Pa formed on the front surface 10a. As a material of the substrate 10, for example, metal such as Al or SUS (stainless steel), a resin film such as polyimide, polyethylene terephthalate, or polyethylene naphthalate, a carbon-based material such as amorphous carbon or carbon fiber reinforced plastic, an FOP (a Fiber Optic Plate: an optical device in which a large number of optical fibers with a diameter of several microns are bundled (for example, J5734 manufactured by Hamamatsu Photonics K.K.)), etc., may be used. As a material of the concave-convex pattern Pa, for example, a high-aspect resist such as epoxide-based resin (KMPR or SU-8 manufactured by Nippon Kayaku Co., Ltd., etc.), silicon, glass, or the like may be used. In particular, a material of the convex portions composing the concave-convex pattern Pa may be a material which is transmissive to scintillation light generated in a scintillator section 20 which will be described later. In such a case, it is possible to paste the scintillator panel 1 and a sensor panel having photoelectric conversion elements together on the side of the back surface 10b of the substrate 10, to compose a radiation detector.

The concave-convex pattern Pa is formed from a plurality of convex portions 11 and a concave portion 12 defined by the convex portions 11. That is, the plurality of convex portions 11 and a concave portion 12 are formed on the substrate 10. Each of the convex portions 11 projects from the front surface 10a along a predetermined direction toward the front surface 10a from the back surface 10b of the substrate 10 (here, an incident direction of the radiation R, and a direction perpendicular to the front surface 10a and the back surface 10b of the substrate 10). Each of the convex portions 11 is formed into a rectangular parallelepiped. The convex portions 11 are arrayed periodically in a two-dimensional array on the front surface 10a of the substrate 10. Accordingly, the concave portion 12 defined by the convex portions 11 is a groove showing rectangular lattice-shapes in planar view.

With respect to the respective dimensions of this concave-convex pattern Pa, for example, a width (groove width) W of the concave portion 12 may be set to approximately 35 μm in the case where a pitch (a cycle of forming the convex portions 11) P between the convex portions 11 is approximately 100 μm, the width W of the concave portion 12 may be set to approximately 20 μm to 40 μm in the case where the pitch P between the convex portions 11 is approximately 127 μm, and the width W of the concave portion 12 may be set to approximately 50 μm to 70 μm in the case where the pitch P between the convex portions 11 is approximately 200 μm. Further, a height H of the convex portion 11 may be set to approximately 2.5 μm to 50 μm. In particular, in the present embodiment, the pitch P between the convex portions 11 is approximately 127 μm, the width W of the concave portion 12 is approximately 45 μm, and the height H of the convex portion 11 is approximately 15 μm.

The scintillator panel 1 includes a plurality of scintillator sections (first scintillator sections) 20 which are formed on the respective convex portions 11, and a scintillator section (second scintillator section) 30 which is formed in the concave portion 12. The scintillator sections 20 are separated from one another (that is, the scintillator panel 1 has the separated type scintillator sections). The scintillator section 30 is integrally formed all over the concave portion 12. The scintillator sections 20 and 30 may be formed of a scintillator material forming columnar crystals, for example, such as CsI (cesium iodide). A height (scintillator film thickness) T of the scintillator section 20 may be, for example, approximately 100 μm to 600 μm.

The scintillator section 20 has a first portion 21 and a second portion 22. The first portion 21 shows a rectangular shape so as to correspond to a shape of the convex portion 11. The second portion 22 shows a rectangular ring shape so as to cover the side portions of the first portion 21 in planar view. The first portion 21 extends along the incident direction of the radiation R (a direction substantially vertical to the substrate 10) from an upper surface 11a of the convex portion 11. More specifically, the first portion 21 is composed of a plurality of columnar crystals C1 of a scintillator material formed by crystal growth along the incident direction of the radiation R from the upper surface 11a of the convex portion 11.

The second portion 22 extends along the incident direction of the radiation R from side surface 11b of the convex portion 11 so as to contact with the first portion 21. The second portion 22 is formed integrally with the first portion 21 (is bonded to the first portion 21). More specifically, the second portion 22 is composed of a plurality of columnar crystals C2 of a scintillator material formed by crystal growth along a direction intersecting with the incident direction of the radiation R (a direction intersecting with a predetermined direction) from the side surface 11b of the convex portion 11 (the direction substantially vertical to the substrate 10), and extends in its entirety along the incident direction of the radiation R. The columnar crystals C2 are formed all over the side surface 11b of the convex portion 11.

The columnar crystal C1 composing the first portion 21 shows a tapered shape so as to expand its diameter with increasing distance from the upper surface 11a of the convex portion 11. That is, a column diameter R1 of the columnar crystal C1 expands as distance from the upper surface 11a of the convex portion 11 increases (that is, from the base end portion on the upper surface 11a side toward the tip end portion on the opposite side). The columnar crystal C2 composing the second portion 22 shows a tapered shape so as to expand its diameter with increasing distance from the side surfaces 11b of the convex portion 11. That is, a column diameter R2 of the columnar crystal C2 expands as distance from the side surfaces 11b of the convex portion 11 increases (that is, from the base end portion on the side surface 11b side toward the tip end portion on the opposite side).

In particular, an enlargement factor of the column diameter R2 of the columnar crystal C2 is greater than an enlargement factor of the column diameter R1 of the columnar crystal C1. Accordingly, for example, at each tip end portion, the column diameter R2 of the columnar crystal C2 is relatively greater than the column diameter R1 of the columnar crystal C1. In addition, the height H of the convex portion 11 described above is at least greater than the column diameters at the base end portions of the columnar crystals C1 composing the first portion 21 and the columnar crystals C2 composing the second portion 22. Accordingly, the plurality of columnar crystals C1 or columnar crystals C2 are formed on the upper surface 11a or the side surface 11b of the convex portion 11.

The scintillator section 30 is formed in the concave portion 12, especially on a bottom surface 12a of the concave portion 12. The scintillator section 30 is composed of a plurality of columnar crystals of a scintillator material such as CsI in the same way as the first portion 21 and the second portion 22 of the scintillator section 20. The respective columnar crystals composing the scintillator section 30 are formed by crystal growth along the incident direction of the radiation R from the bottom surface 12 of the concave portion 12. The scintillator section 30 shows a convex shape (a substantially triangle shape in cross section) so as to increase in thickness from the corners of the concave portion 12 (the connecting portion between the side surface 11b of the convex portion 11 and the bottom surface 12a of the concave portion 12) toward the center in a width direction of the concave portion 12. The scintillator section 30 is in contact with the second portion 22 so as to support the columnar crystals C2 of the second portion 22 extending from the side surfaces 11b of the convex portion 11, from the side of the bottom surface 12a of the concave portion 12. In fact, a column diameter of a columnar crystal of a portion in contact with the scintillator section 30 in the second portion 22 is smaller than the column diameter R1 of the column diameter C1 of the first portion 21.

The scintillator panel 1 composed as described above can be manufactured, for example, as follows. That is, first, a base member for the substrate 10 is prepared, and a material of the concave-convex pattern Pa is applied onto the base member and dried to be formed thereon. Next, the concave-convex pattern Pa is formed on the base member by photolithography, to fabricate the substrate 10 having the concave-convex pattern Pa in desired dimensions. In addition, the concave-convex pattern Pa may be formed by screen-printing on the base member. Then, a scintillator material such as CsI is vapor-deposited on the substrate 10 by vacuum vapor deposition. By controlling the respective vapor deposition conditions (a degree of vacuum, a vapor deposition rate, a substrate heating temperature, an angle of vapor flow, and the like), it is possible to form the scintillator sections 20 and 30 as described above on the concave-convex pattern Pa.

Figure 4:
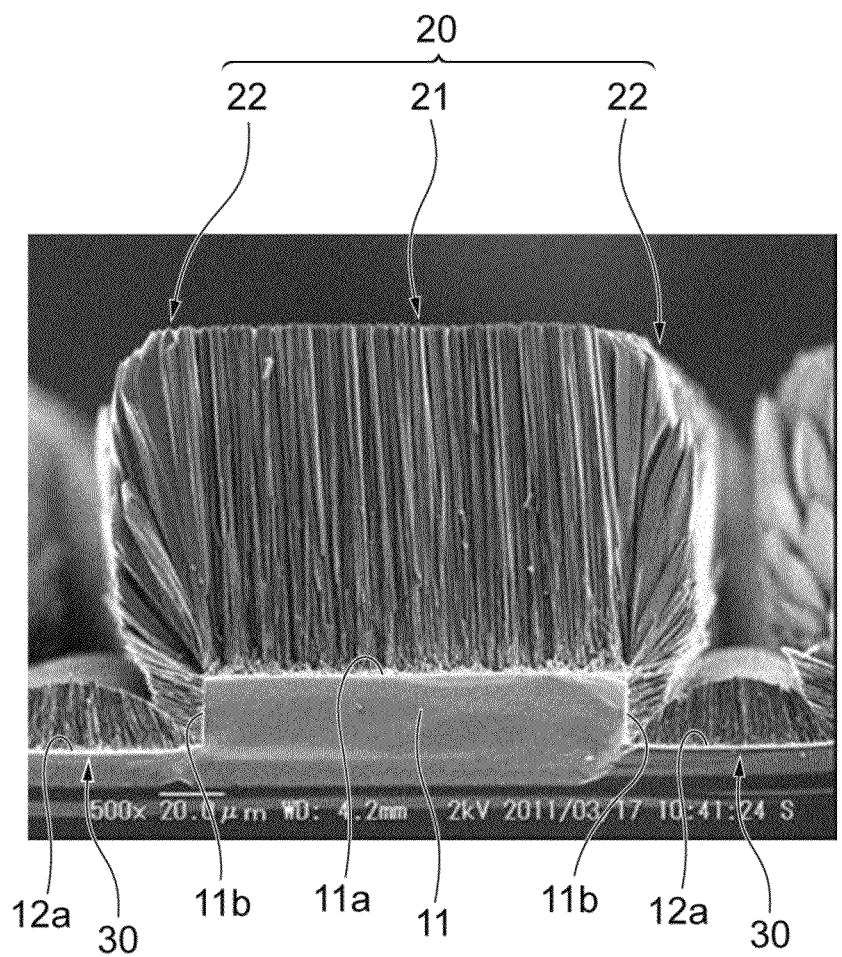
FIG. 4 is a cross-sectional photograph showing an example of the scintillator panel shown in FIG. 1.

At this time, the vapor deposition of the scintillator material is carried out until the scintillator sections on the upper surface 11a of the convex portion 11 reach a predetermined height (for example, 100 μm to 600 μm). Thereby, as shown in FIG. 4, the first portion 21 is formed on the upper surface 11a of the convex portion 11 and the second portion 22 is formed on the side surface 11b of the convex portion 11, to compose the scintillator section 20. Further, at the same time, the scintillator section 30 is formed on the bottom surface 12a of the concave portion 12, to manufacture the scintillator panel 1.

In addition, the respective dimensions (the pitch P between the convex portions 11, the width W of the concave portion 12, the height H of the convex portion 11, and the like) of the concave-convex pattern Pa of the substrate 10 may be set to the respective values described above in order to form the scintillator sections 20 and 30. However, in particular, the width W of the concave portion 12 and the height H of the convex portion 11 may be set as follows according to the height T of the scintillator section 20 formed by vapor deposition.

That is, the width W of the concave portion 12 may be set to approximately 1 μm to 10 μm in the case where the height T of the scintillator section 20 is set to be less than 100 μm, the width W of the concave portion 12 may be set to approximately 10 μm to 40 μm in the case where the height T of the scintillator section 20 is set to 100 μm to 200 μm, the width W of the concave portion 12 may be set to approximately 40 μm to 60 μm in the case where the height of the scintillator section 20 is set to 200 μm to 400 μm, and the width W of the concave portion 12 may be set to approximately 60 μm to 80 μm in the case where the height T of the scintillator section 20 is set to 400 μm to 600 μm. At this time, the height H of the convex portion 11 may be set to 5 μm to 50 μm, for example.

In this way, the width W of the concave portion 12 and the height H of the convex portion 11 are set according to the height H of the scintillator section 20, it is possible to separate the scintillator sections 20 formed by vapor deposition from each other (that is, it is possible to realize pixilation of the scintillator sections), and it is possible to form the scintillator section 30 on the bottom surface 12a of the concave portion 12. In addition, from the viewpoint of the problem of aperture ratio, it is not realistic to expand the width W of the concave portion 12 excessively wide.

As described above, the scintillator panel 1 according to the present embodiment includes the scintillator sections 20 which are formed on the plurality of convex portions 11 of the substrate 10, and the scintillator section 30 which is formed on the bottom surface 12a of the concave portion 12 which are defined by the convex portions 11 of the substrate 10. In particular, the scintillator section 20 includes, in addition to the first portion 21 extending from the upper surface 11a of the convex portion 11, the second portion 22 extending from the side surfaces 11b of the convex portion 11. Therefore, the contact area between the scintillator section 20 and the substrate 10 is increased, thereby adhesiveness is improved.

Further, in the scintillator panel 1 according to the present embodiment, the second portion 22 extending from the side surface 11b of the convex portion 11 is in contact with the scintillator section 30 formed on the bottom surface 12a of the concave portion 12. Therefore, because the plurality of columnar crystals C2 composing the second portion 22 are supported by the scintillator section 30 from the side of the bottom surface 12a of the concave portion 12, these are prevented from missing. Therefore, in accordance with this scintillator panel 1, it is possible to suppress a decrease in reliability.

Further, in the scintillator panel 1 according to the present embodiment, an enlargement factor of the column diameter R2 of the columnar crystals C2 composing the second portion 22 is greater than an enlargement factor of the column diameter R1 of the columnar crystals C1 composing the first portion 21 of the scintillator section 20. Therefore, especially at each tip end portion, the column diameter R2 of the columnar crystals C2 of the second portion 22 is greater than the column diameter R1 of the columnar crystals C1 of the first portion 21. Thereby, an effective area is made wider when viewed from the incident direction of the radiation R and the absorbance of the radiation R is increased.

Moreover, in the scintillator panel 1 according to the present embodiment, because the height H of the convex portion 11 is made greater than the column diameters of the respective columnar crystals, not only is it possible to securely form the plurality of columnar crystals C2 on the side surface 11b of the convex portion 11, but it is also possible to securely form the scintillator sections 20 so as to be separated from each other on the convex portions 11. In the case where the height H of the convex portions 11 is insufficient, when the scintillator sections 20 are formed by vapor deposition, the scintillator sections 20 adjacent to one another may come into contact with each other in some cases.

Second Embodiment

Figure 5:
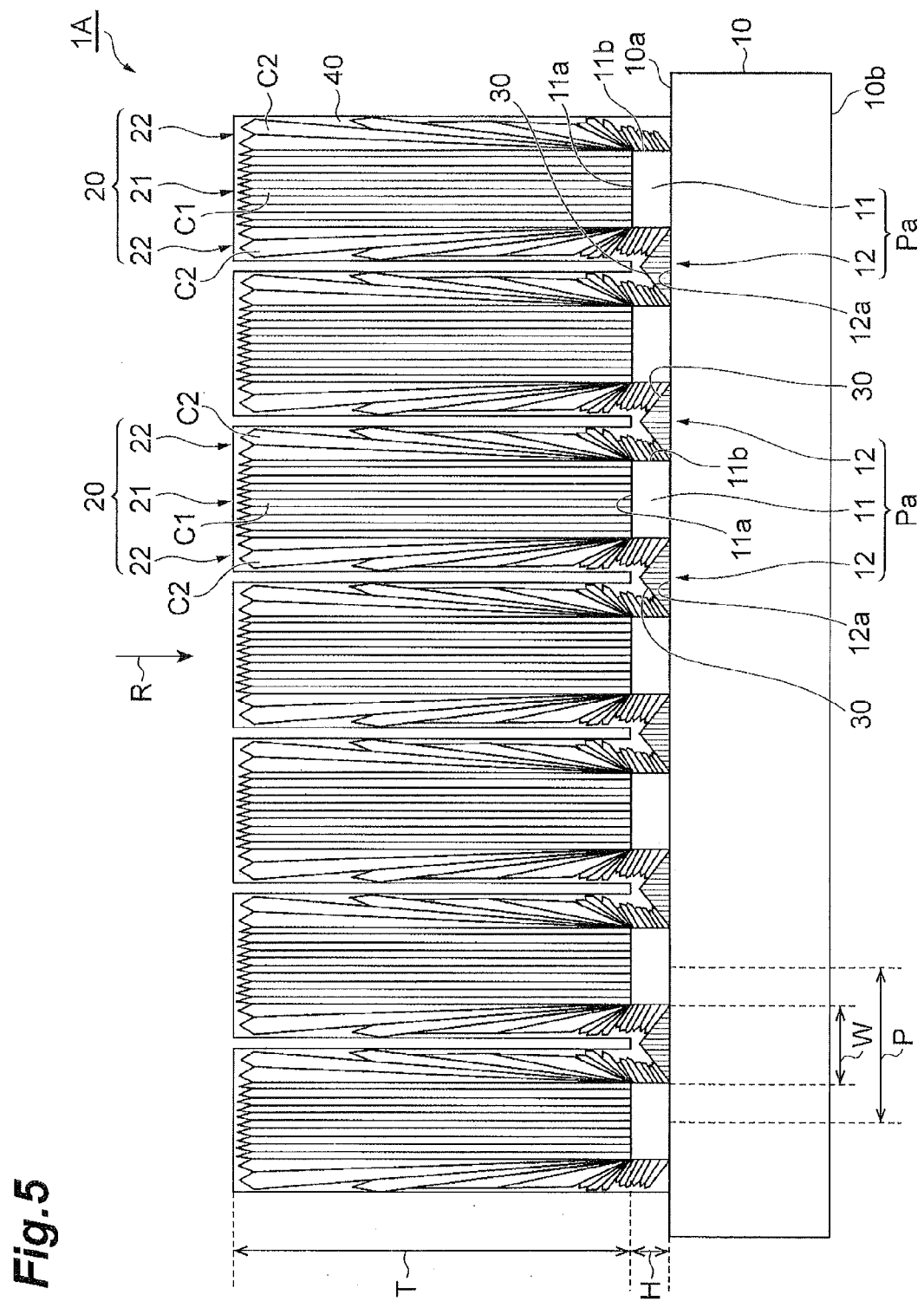
FIG. 5 is a side view of a scintillator panel according to a second embodiment.

Next, a scintillator panel according to a second embodiment will be described. FIG. 5 is a side view of the scintillator panel according to the second embodiment. As shown in FIG. 5, a scintillator panel 1A according to the present embodiment is, as compared with the scintillator panel 1 according to the first embodiment, different in the point that the scintillator panel 1A further includes a protective film 40.

The protective film 40 is formed on the scintillator sections 20 and 30 so as to cover the whole of the scintillator sections 20 and 30 along the outline of the scintillator section 20. In particular, the protective film 40 is also formed between the scintillator sections 20 adjacent to one another, meanwhile, the protective film 40 is formed so as not to fill a gap between the scintillator sections 20 adjacent to one another (that is, so as to keep the gap). Specifically, the thickness of the protective film 40 may be, for example, approximately 1 μm to 5 μm, and may be set to approximately 2 μm to 3 μm. The protective film 40 may be a moisture-resistant organic film made of polyparaxylylene, polyurea, or the like, for example.

In accordance with the scintillator panel 1A according to the present embodiment, in the same way as the scintillator panel 1 according to the first embodiment, it is possible to suppress a decrease in reliability. Further, in accordance with the scintillator panel 1A according to the present embodiment, by providing the protective film 40, it is possible to protect the scintillator sections 20 and 30 from moisture and the like, thereby the moisture resistance of the scintillator section 20 is improved.

Third Embodiment

Figure 6:
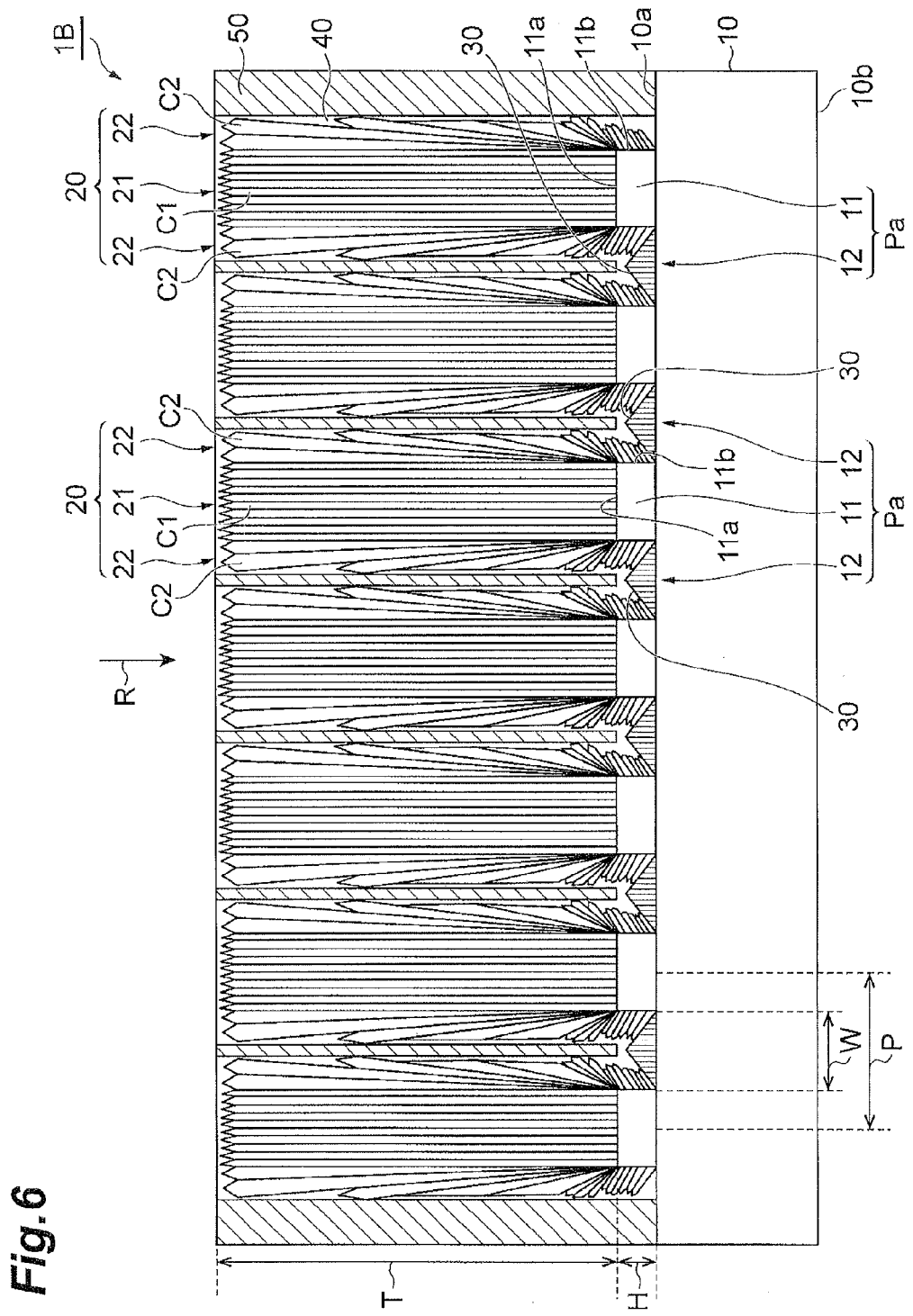
FIG. 6 is a side view of a scintillator panel according to a third embodiment.
Figure 7:
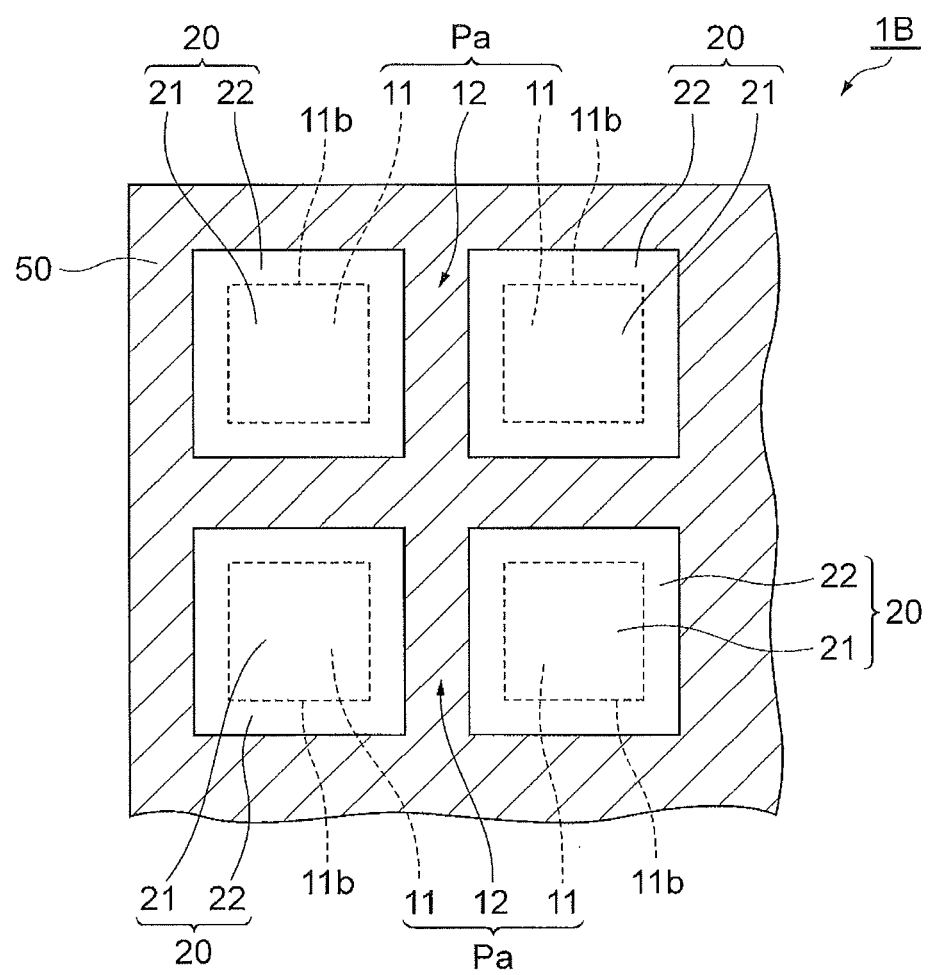
FIG. 7 is a partial plan view of the scintillator panel shown in FIG. 6.

Next, a scintillator panel according to a third embodiment will be described. FIG. 6 is a side view of the scintillator panel according to the third embodiment. FIG. 7 is a partial plan view of the scintillator panel shown in FIG. 6. As shown in FIGS. 6 and 7, a scintillator panel 1B according to the present embodiment is, as compared with the scintillator panel 1A according to the second embodiment, different in the point that the scintillator panel 1B further includes a light shielding layer 50. In addition, in FIG. 7, the protective film 40 is omitted.

The light shielding layer 50 is a light reflection layer reflecting scintillation light generated in the scintillator section 20, or a light absorbing layer absorbing scintillation light generated in the scintillator section 20. That is, the light shielding layer 50 is for shielding scintillation light generated in a predetermined scintillator section 20, to confine the scintillation light to the predetermined scintillator section 20.

For that, the light shielding layer 50 is formed so as to be filled in a gap between the scintillator sections 20 adjacent to one another via the protective film 40. Further, with respect to the scintillator sections 20 located at the outer circumferential portions of the scintillator panel 1B, the light shielding layer 50 is also formed via the protective film 40 on the side portions which are not adjacent to the other scintillator sections 20. On the other hand, the light shielding layer 50 is not formed on the upper end portion of the scintillator sections 20 (the end portion on the opposite side of the convex portion 11).

Accordingly, the light shielding layer 50 is formed on the protective film 40 so as to cover the whole of the respective scintillator sections 20 except the upper end portions of the scintillator sections 20 (in other words, the respective scintillator sections 20 are covered with the protective film 40 at the upper end portions thereof and are exposed from the light shielding layer 50). This light shielding layer 50 may be, for example, an ink, a coating material, or a paste containing organic pigment, inorganic pigment, or metallic pigment, or a metallic nano-ink containing metallic nanoparticles such as Ag, Pt, or Cu, or various types of dye compounds. Further, the light shielding layer 50 may be formed by forming a metallic film by an ALD method (Atomic Layer Deposition method), nonelectrolytic plating, or the like.

In accordance with the scintillator panel 1B according to the present embodiment, in the same way as the scintillator panel 1A according to the second embodiment, it is possible to suppress a decrease in reliability, and improve the moisture resistance. Further, in accordance with the scintillator panel 1B according to the present embodiment, because it is possible to confine scintillation light generated in a predetermined scintillator section 20, to the predetermined scintillator section 20 by providing the light shielding layer 50, it is possible to realize high brightness and high resolution.

Fourth Embodiment

Figure 8:
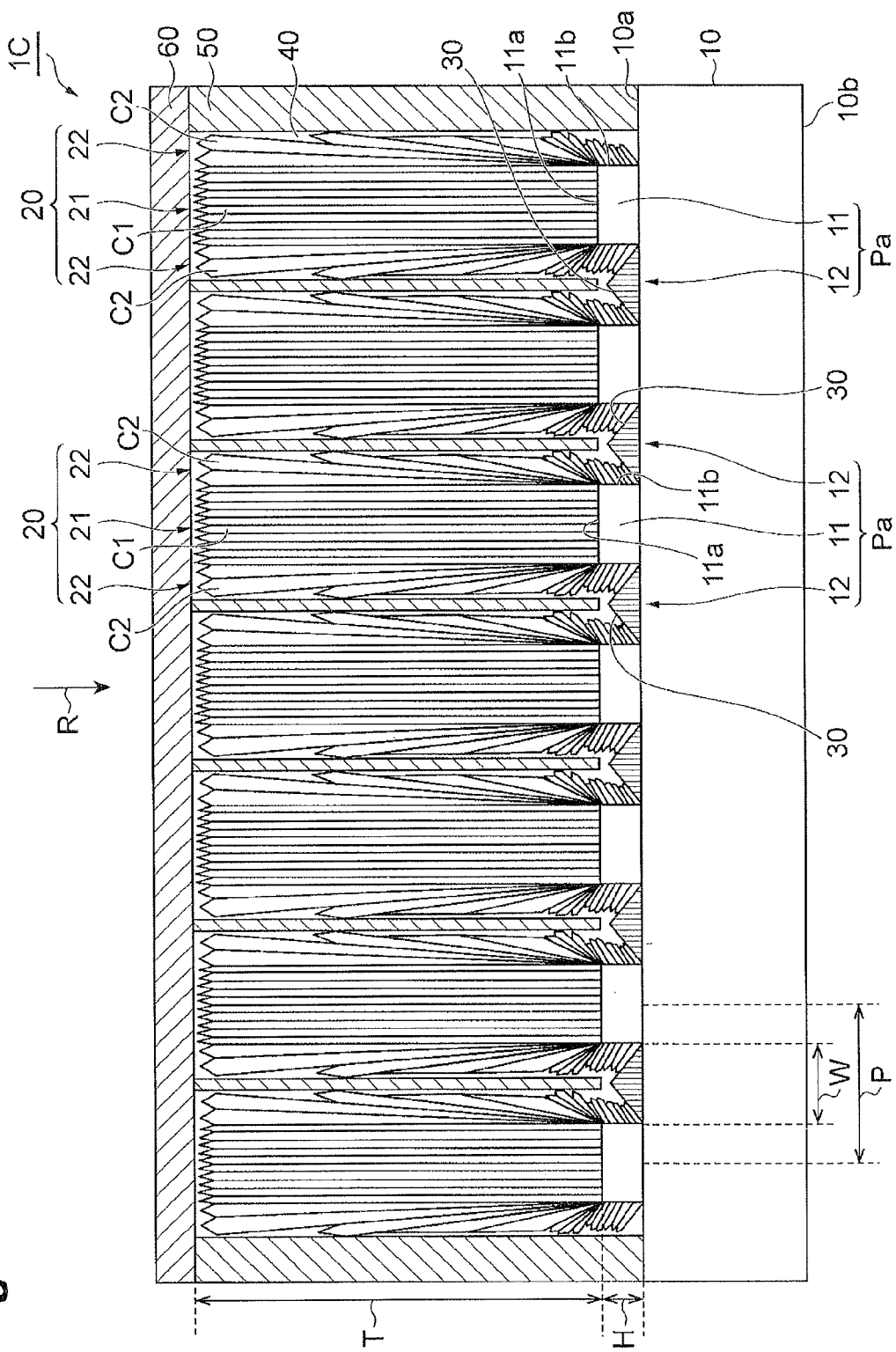
FIG. 8 is a side view of a scintillator panel according to a fourth embodiment.

Next, a scintillator panel according to a fourth embodiment will be described. FIG. 8 is a side view of the scintillator panel according to the fourth embodiment. As shown in FIG. 8, a scintillator panel 1C according to the present embodiment is, as compared with the scintillator panel 1B according to the third embodiment, different in the point that the scintillator panel 1C further includes a light shielding layer 60. The light shielding layer 60 is, in the same way as the light shielding layer 50, for shielding scintillation light, and is a light reflection layer reflecting scintillation light, or a light absorbing layer absorbing scintillation light.

The light shielding layer 60 is formed on the protective film 40 and the light shielding layer 50 all over the substrate 10 so as to cover the upper end portions of the scintillator sections 20 (the protective film 40 on the upper end portions) exposed from the light shielding layer 50. The light shielding layer 60 may be formed integrally with the light shielding layer 50, or may be formed separately from the light shielding layer 50. Further, the light shielding layer 50 may be formed from a material which is the same as that of the light shielding layer 50, or may be formed from a material different from that of the light shielding layer 50.

In accordance with the scintillator panel 1C according to the present embodiment, in the same way as the scintillator panel 1A according to the second embodiment, it is possible to suppress a decrease in reliability, and improve the moisture resistance. Further, in accordance with the scintillator panel 1C according to the present embodiment, it is possible to securely confine scintillation light generated in a predetermined scintillator section 20, to the predetermined scintillator section 20 by providing the light shielding layers 50 and 60.

The above-described embodiments have been described as an embodiment of a scintillator panel according to an aspect of the present invention. Accordingly, an aspect of the present invention is not limited to the above-described scintillator panels 1 to 1C. An aspect of the present invention makes it possible so as to arbitrarily change the above-described scintillator panels 1 to 1C, or to be applied to another one within the range without changing the gist of the respective Claims.

For example, in the above-described embodiments, the case where an aspect of the present invention is applied to a scintillator panel has been described. Meanwhile, an aspect of the present invention is applicable to a radiation detector including the above-described scintillator panel or the like. In such a case, the radiation detector includes any one of the above-described scintillator panels 1 to 1C, and the substrate 10 thereof may be a sensor panel including a plurality of photoelectric conversion elements arrayed so as to be optically coupled to the scintillator sections 20 (a TFT panel or a CMOS image sensor panel).

In such a case, for example, the convex portions 11 respectively corresponding to the respective pixels of an TFT panel or a CMOS image sensor as the substrate 10 are formed, and the scintillator sections 20 and 30 are formed thereon. A material and a method of forming the convex portions 11 are as described above. At that time, each of the convex portions 11 may be composed of a material transmissive to scintillation light generated in the scintillator section 20.

In accordance with this radiation detector, because the radiation detector includes the above-described scintillator panels 1 to 1C, it is possible to suppress a decrease in reliability. Further, because the substrate 10 is a sensor panel including the photoelectric conversion elements, provided that the convex portions 11 are directly formed on the photoelectric conversion elements, to provide the scintillator sections 20, there is no need to paste together a scintillator panel and a sensor panel which are separately prepared.

INDUSTRIAL APPLICABILITY

In accordance with an aspect of the present invention, it is possible to provide a scintillator panel having separated type scintillator sections and a radiation detector having separated type scintillator sections, which are capable of suppressing a decrease in reliability.

REFERENCE SIGNS LIST 1, 1A, 1B, 1C ... scintillator panel, 10 ... substrate (sensor panel), 11 ... convex portion, 11a ... upper surface, 11b ... side surface, 12 ... concave portion, 12a ... bottom surface, 20 ... scintillator section (first scintillator section), 21 ... first portion, 22 ... second portion, 30 ... scintillator section (second scintillator section), 40 ... protective film, 50 ... light shielding layer, 60 ... light shielding layer, C1, C2 ... columnar crystal, R ... radiation, R1, R2 ... column diameter.

The invention claimed is:

1. A scintillator panel for converting radiation into scintillation light, the scintillator panel comprising:
a substrate having a front surface and a back surface, and formed with a plurality of convex portions projecting from the front surface in a predetermined direction toward the front surface from the back surface and a concave portion defined by the convex portions;
a plurality of first scintillator sections formed on the respective convex portions of the substrate; and
a second scintillator section formed on the bottom surface of the concave portion of the substrate;
wherein the convex portions are arrayed periodically in a two-dimensional array,
the first scintillator section has a first portion extending along the predetermined direction from an upper surface of the convex portion, and a second portion extending along the predetermined direction from side surfaces of the convex portion so as to contact with the first portion, the first and second portions are composed of a plurality of columnar crystals of a scintillator material, the first scintillator sections are separated from one another, and the second scintillator section is in contact with the second portion.

2. The scintillator panel according to claim 1, wherein the first portion is composed of a plurality of the columnar crystals formed by crystal growth along the predetermined direction from the upper surface of the convex portion, and the second portion is composed of a plurality of the columnar crystals formed by crystal growth along a direction intersecting with the predetermined direction from the side surfaces of the convex portion.

3. The scintillator panel according to claim 2, wherein a column diameter of the columnar crystals composing the first portion expands as distance from the upper surface of the convex portion increases, a column diameter of the columnar crystals composing the second portion expands as distance from the side surfaces of the convex portion increases, and an enlargement factor of a column diameter of the columnar crystals composing the second portion is greater than an enlargement factor of a column diameter of the columnar crystals composing the first portion.

4. The scintillator panel according to claim 1, wherein a height of the convex portion is greater than column diameters of the columnar crystals.

5. The scintillator panel according to claim 1 further comprising a protective film formed so as to cover the first and second scintillator sections.

6. The scintillator panel according to claim 1 further comprising a light shielding layer formed among the first scintillator sections, and for shielding the scintillation light.

7. A radiation detector comprising;

a substrate having a front surface and a back surface, and formed with a plurality of convex portions projecting from the front surface in a predetermined direction toward the front surface from the back surface and a concave portion defined by the convex portions, the substrate having a plurality of photoelectric conversion elements;

a plurality of first scintillator sections formed on the respective convex portions of the substrate; and a second scintillator section formed on the bottom surface of the concave portion of the substrate;

wherein the convex portions are formed so as to correspond to each of the photoelectric conversion elements, and arrayed periodically in a two-dimensional array, the first scintillator section has a first portion extending along the predetermined direction from an upper surface of the convex portion, and a second portion extending along the predetermined direction from side surfaces of the convex portion so as to contact with the first portion, the first and second portions are composed of a plurality of columnar crystals of a scintillator material, the first scintillator sections are separated from one another, and the second scintillator section is in contact with the second portion.

8. The radiation detector according to claim 7, wherein the convex portions of the substrate are transmissive to the scintillation light.

* * * * *